United States Patent
Chou

(10) Patent No.: US 10,416,368 B2
(45) Date of Patent: Sep. 17, 2019

(54) MOUSE PAD WITH LATERAL LIGHT GUIDE FUNCTION

(71) Applicant: Hades-Gaming Corporation, New Taipei (TW)

(72) Inventor: Hung-Jen Chou, New Taipei (TW)

(73) Assignee: HADES-GAMING CORPORATION, New Taipei (TW)

( * ) Notice: Subject to any disclaimer, the term of this patent is extended or adjusted under 35 U.S.C. 154(b) by 44 days.

(21) Appl. No.: 15/603,461

(22) Filed: May 24, 2017

(65) Prior Publication Data

US 2018/0239075 A1 Aug. 23, 2018

(30) Foreign Application Priority Data

Feb. 21, 2017 (TW) .............................. 106202517 U

(51) Int. Cl.
*F21V 8/00* (2006.01)
*G06F 3/039* (2013.01)

(52) U.S. Cl.
CPC ......... *G02B 6/0023* (2013.01); *G02B 6/0065* (2013.01); *G02B 6/0095* (2013.01); *G06F 3/0395* (2013.01); *G02B 6/0091* (2013.01)

(58) Field of Classification Search
CPC .. G02B 6/0023; G02B 6/0065; G02B 6/0095; G06F 3/0395
See application file for complete search history.

(56) References Cited

U.S. PATENT DOCUMENTS

| | | | | |
|---|---|---|---|---|
| 5,942,311 A | * | 8/1999 | Scianna | B32B 27/06 248/346.01 |
| 2004/0130912 A1 | * | 7/2004 | Miyashita | G02B 6/002 362/561 |
| 2013/0058129 A1 | * | 3/2013 | Limber | G06F 1/3231 362/605 |

\* cited by examiner

*Primary Examiner* — Thomas M Sember
(74) *Attorney, Agent, or Firm* — Chun-Ming Shih; HDLS IPR Services

(57) ABSTRACT

A mouse pad with a light guide function includes a light guide plate installed on a side of a pad, a lateral light source installed at a side edge of the light guide plate, a shading structure installed at the top of the lateral light source and disposed together with the lateral light source on the same side of the light guide plate, and the mouse pad can guide light of the lateral light source through the installation of the shading structure without passing from the top of the lateral light source, so as to simplify the manufacturing process.

8 Claims, 3 Drawing Sheets

MOUSE PAD WITH LATERAL LIGHT GUIDE FUNCTION

FIELD OF THE INVENTION

This disclosure relates to a mouse pad, and more particularly to a mouse pad with a light guide function.

BACKGROUND OF THE INVENTION

In general, a mouse pad is provided to operate a mouse and sense the displacement of the mouse accurately, and present existing mouse pads also include light emitting mouse pads with a cool dazzling design in addition to soft and hard mouse pads, and the light emitting mouse pads adopt embedded light emitting diodes (LED) or cold cathode fluorescent tubes (CCFL) to provide a light source and improve the users' visual experience.

However, the conventional light emitting mouse pad incurs complicated manufacturing and assembling processes due to its structure with the light source embedded in the pad, and thus requires improvements.

In view of the aforementioned drawback of the prior art, the discloser of this disclosure conducted extensive research and provided a feasible design to overcome the drawback of the prior art.

SUMMARY OF THE INVENTION

Therefore, it is a primary objective of the present invention to provide a mouse pad with a light guide function to simplify the manufacturing process, and guide light of a lateral light source.

To achieve the aforementioned and other objectives, this disclosure provides a mouse pad with a light guide function capable of guiding light of a lateral light source, comprising: a pad, a light guide plate, and a shading structure. The light guide plate is installed on a side of a pad, and the lateral light source is installed at a side edge of the light guide plate, and the shading structure is installed at the top of the lateral light source and disposed together with the lateral light source on the same side of the light guide plate, and the mouse pad allows the light of the lateral light source to enter into the pad without passing through the top of the lateral light source through the installation of the shading structure.

Compared with the prior art, the mouse pad with a light guide function of this disclosure comprises a pad, a light guide plate, and a shading structure installed in sequence, and the lateral light source is installed at a side edge of the light guide plate, and the shading structure is installed at the top of the lateral light source and disposed together with the lateral light source on the same side of the light guide plate. Therefore, the mouse pad allows the light of the lateral light source to enter into the pad without passing through the top of the lateral light source through the installation of the shading structure, so as to achieve a lateral light guide effect and provide a uniform light emission of the mouse pad.

DESCRIPTION OF THE PREFERRED EMBODIMENTS

The technical contents of the present invention will become apparent with the detailed description of preferred embodiments accompanied with the illustration of related drawings as follows. It is noteworthy that the preferred embodiments are provided for illustrating this disclosure rather than restricting the scope of the disclosure.

Figure 1:
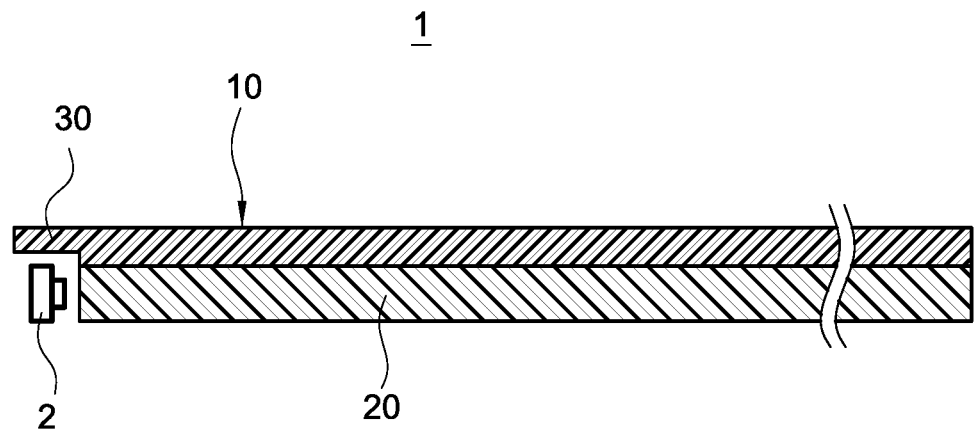
FIG. 1 is a cross-sectional view of a mouse pad of a first preferred embodiment of this disclosure.

With reference to FIG. 1 for a cross-sectional view of a mouse pad with a light guide function of this disclosure, the mouse pad with a light guide function 1 is capable of guiding light of a lateral light source 2. The mouse pad 1 comprises a pad 10, a light guide plate 20, and a shading structure 30. The light guide plate 20 is combined with the pad 10, and the shading structure 30 is provided for sheltering a side of the lateral light source 2 to prevent light from entering the pad 10 from the top of the lateral light source 2.

The pad 10 is a flat plate formed by silicone, rubber, or sponge, or any other material as needed.

The light guide plate 20 is made of a light guide material. In this preferred embodiment, the light guide plate 20 is made of light guide silicone or light guide rubber, so that the light guide plate 20 has an anti-slip effect. In this preferred embodiment, the light guide plate 20 is installed on a side of the pad 10, and the lateral light source 2 is installed at a side edge of the light guide plate 20.

In addition, the shading structure 30 is installed at the top of the lateral light source 2 and disposed together with the lateral light source 2 on the same side of the light guide plate 20. In a practical application, the lateral light source 2 allows the light of the lateral light source 2 to enter into the pad 10 without passing through the top of the lateral light source through the installation of the shading structure 30, so as to achieve a lateral light guide effect and provide a uniform light emission of the mouse pad 1 of this disclosure.

Specifically, the shading structure 30 extends from a side edge of the pad 10 proximate to the lateral light source 2 towards the lateral light source 2 and shelters the top of the lateral light source 2. Preferably, the shading structure 30 and the pad 10 are integrally formed and extended directly from a side of the pad 10.

Figure 2:
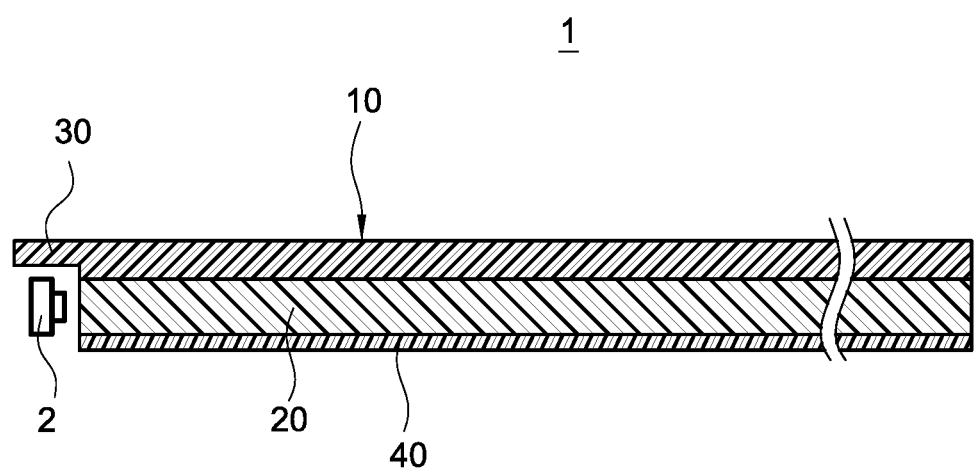
FIG. 2 is a cross-sectional view of a light guide plate in accordance with another implementation of the first preferred embodiment of this disclosure.

With reference to FIG. 2 for another implementation of a light guide plate in accordance with the first preferred embodiment of this disclosure, the light guide plate 20 is made of plastic without any anti-slip effect. Therefore, the mouse pad 1 further comprises a slip mat 40 installed on an outer side of the light guide plate 20 to provide an anti-slip effect to the light guide plate 20.

Figure 3:
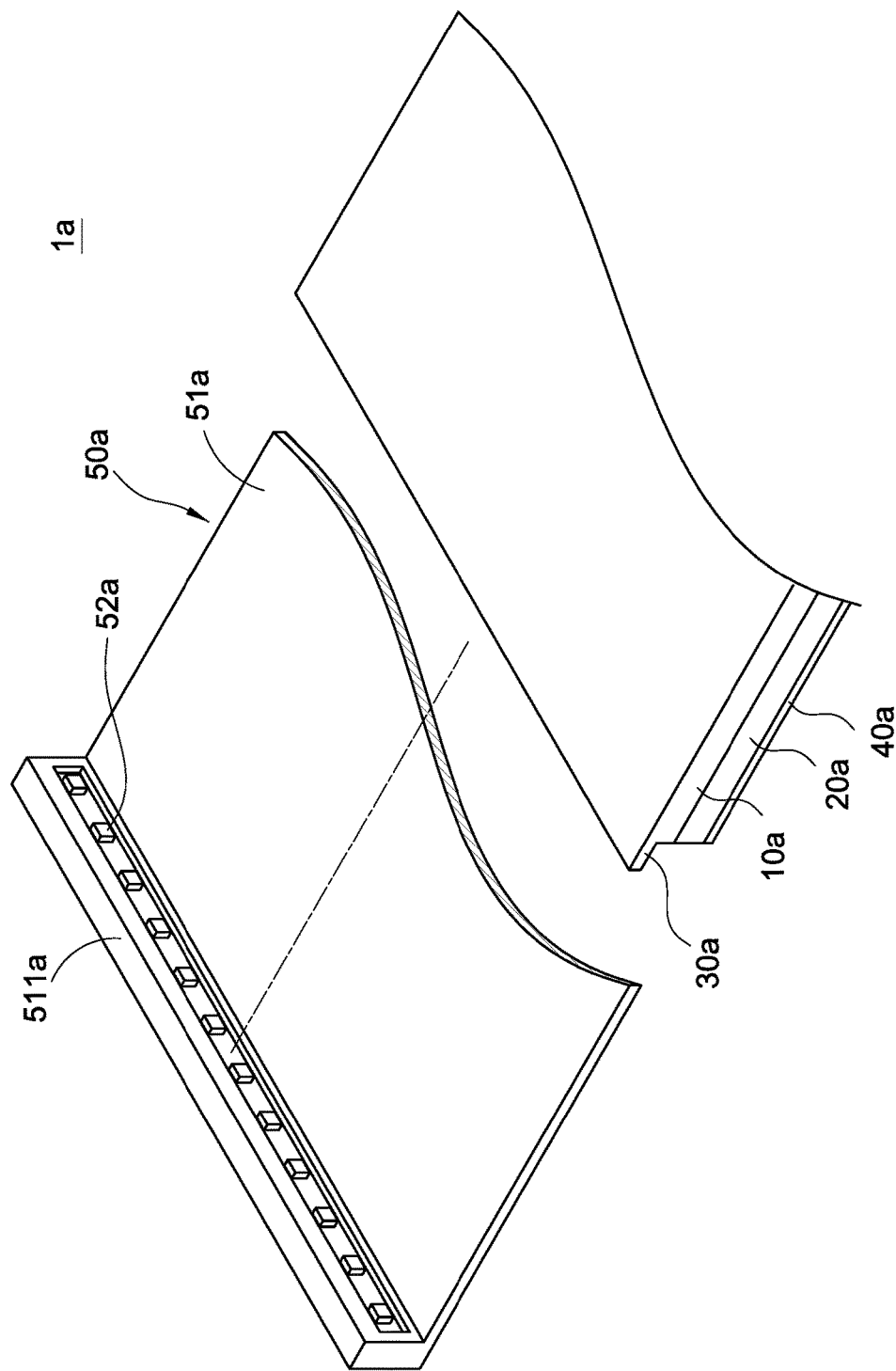
FIG. 3 is an exploded view of a mouse pad of a second preferred embodiment of this disclosure.
Figure 4:
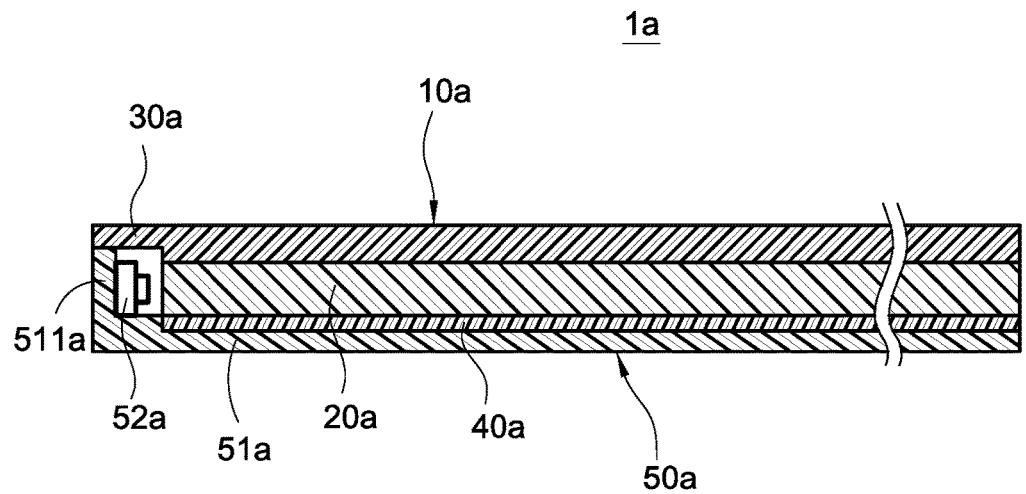
FIG. 4 is a cross-sectional view of a mouse pad of the second preferred embodiment of this disclosure.

With reference to FIGS. 3 and 4 for an exploded view and a cross-sectional view of a mouse pad with a light guide function in accordance with the second preferred embodiment of this disclosure respectively, the mouse pad 1a comprises a pad 10a, a light guide plate 20a, and a shading structure 30a. This preferred embodiment and the former preferred embodiment are substantially the same, except that the mouse pad 1a of this preferred embodiment further comprises a light source module 50a, and the structure of the mouse pad 1a is described below.

The light guide plate 20a is installed on a side of the pad 10a. The light source module 50a comprises a base 51a and a lateral light source 52a installed on the base 51a. The base 51a is disposed on a bottom side of the light guide plate 20a, and the lateral light source 52a is disposed on a side of the light guide plate 20a. Preferably, the base 51a has a side plate 511a, and the lateral light source 52a is disposed on a side of the side plate 511a facing the light guide plate 20a.

In addition, the light guide plate 20a is made of plastic, light guide silicone, or light guide rubber. When the light guide plate 20a is made of a material (such as the plastic) without any anti-slip effect, the mouse pad 1 further comprises a slip mat 40a installed between the light guide plate 20a and the base 51a.

Further, the shading structure 30a is installed at the top of the lateral light source 52a and the shading structure 30a and the lateral light source 52a are disposed on the same side of the light guide plate 20a. The light of the lateral light source 52a enters into the pad 10a without passing through the top of the lateral light source 52a through the installation of the shading structure 30a.

In this preferred embodiment, the shading structure 30a is installed at the top of the lateral light source 52a, and the shading structure 30a and the lateral light source 52a are disposed on the same side of the light guide plate 20a. The mouse pad 1 allows the light of the lateral light source 52a to enter into the pad 10a without passing through the top of the lateral light source 52a through the installation of the shading structure 30, so as to achieve the lateral light guide effect and provide a uniform light emission to the mouse pad 1a of this disclosure.

Specifically, the shading structure 30a extends from a side edge of the pad 10a proximate to the lateral light source 52a towards the lateral light source 52a and shelters the top of the lateral light source 52a. Preferably, the shading structure 30a and the pad 10a are integrally formed and directly extended from a side of the pad 10a.

Figure 5:
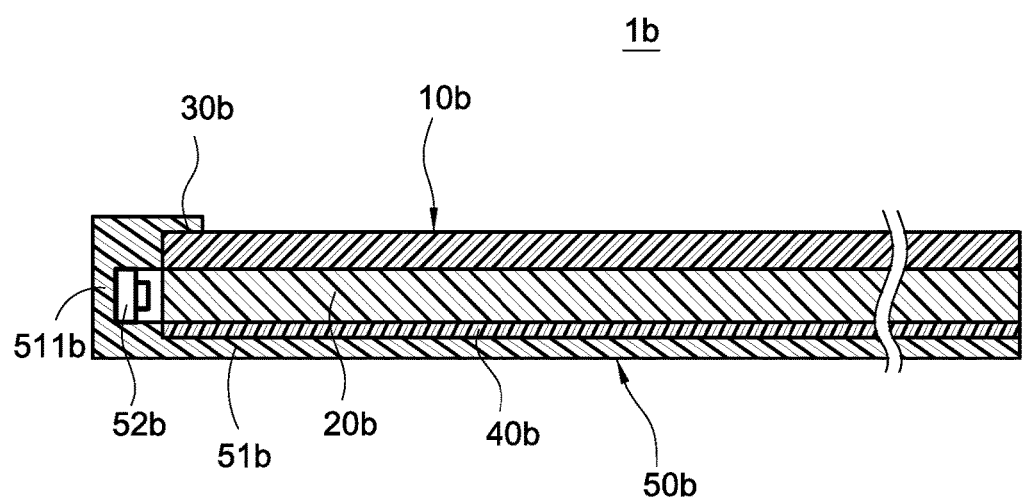
FIG. 5 is a cross-sectional view of a shading structure of a mouse pad in accordance with another implementation of the first preferred embodiment of this disclosure.

With reference to FIG. 5 for another implantation of a shading structure of a mouse pad in accordance with the second preferred embodiment of this disclosure, this preferred embodiment and the former preferred embodiment are substantially the same, except that the mouse pad 1b further comprises a pad 10b, a light guide plate 20b, a shading structure 30b, a slip mat 40b and a light source module 50b. The light source module 50b includes a base 51b and a lateral light source 52b installed on the base 51b. The base 51b is installed on a bottom side of the light guide plate 20b, and the lateral light source 52b is disposed on a side of the light guide plate 20b, and the base 51b has a side plate 511b, and the lateral light source 511b is disposed on a side of the side plate 511b facing the light guide plate 20b. The difference between this preferred embodiment and the former preferred embodiment resides on the structural configuration of the shading structure 30b.

In this preferred embodiment, the shading structure 30b extends from a side edge of a side plate 511b of the base 51b proximate to the lateral light source 52b towards the lateral light source 52b to shelter the top of the lateral light source 52b. Preferably, the shading structure 30b and the base 51b are integrally formed and directly extended from a side of the base 51b. Preferably, the shading structure 30b is extended to cover a portion of the pad 10, but the invention is not limited by such arrangement as long as the shading structure 30b shelters the top of the lateral light source 52b.

While the invention has been described by means of specific embodiments, numerous modifications and variations could be made thereto by those skilled in the art without departing from the scope and spirit of the invention set forth in the claims.

What is claimed is:

1. A mouse pad with a light guide function, capable of guiding light of a lateral light source, comprising:
   a pad;
   a light guide plate, installed to a side of the pad, and the lateral light source being installed to a side edge of the light guide plate; and
   a shading structure, installed above the lateral light source, and disposed together with the lateral side source on a same side of the light guide plate, and the mouse pad allowing the light of the lateral light source to enter into the pad through the light guide plate, and the shading structure preventing the light from passing through a top of the lateral light source;
   wherein the shading structure extends from the pad and only covers the top of the lateral light source; and
   wherein the shading structure and the pad are integrally formed as a single piece plate which is removable and replaceable as needed.

2. The mouse pad with a light guide function of claim 1, wherein the light guide plate is made of plastic.

3. The mouse pad with a light guide function of claim 2, further comprising a slip mat installed on an outer side of the light guide plate.

4. The mouse pad with a light guide function of claim 1, wherein the light guide plate is made of light guide silicone or light guide rubber.

5. A mouse pad with a light guide function, comprising:
   a pad;
   a light guide plate, installed on a side of the pad;
   a light source module, including a base and a side plate disposed on the base, and
   a lateral light source installed on the side plate, and the base being disposed on a bottom side of the light guide plate and the lateral light source being disposed on a side of the light guide plate; and
   a shading structure, installed at a top of the lateral light source, and disposed together with the lateral light source on a same side of the light guide plate, and the light of the lateral light source enters into the pad without passing through the top of the lateral light source through an installation of the shading structure;
   wherein the shading structure extends from the pad or the side plate and only covers the top of the lateral light source.

6. The mouse pad with a light guide function of claim 5, wherein the light guide plate is made of plastic.

7. The mouse pad with a light guide function of claim 6, further comprising a slip mat installed between the light guide plate and the base to provide an anti-slip effect to the light guide plate 20, so that a user can replace the pad as needed.

8. The mouse pad with a light guide function of claim 5, wherein the light guide plate is made of light guide silicone or light guide rubber.

* * * * *